(12) United States Patent
Iyer

(10) Patent No.: US 11,462,033 B2
(45) Date of Patent: Oct. 4, 2022

(54) METHOD AND SYSTEM FOR PERFORMING CLASSIFICATION OF REAL-TIME INPUT SAMPLE USING COMPRESSED CLASSIFICATION MODEL

(71) Applicant: Wipro Limited, Bangalore (IN)

(72) Inventor: Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 155 days.

(21) Appl. No.: 17/109,189

(22) Filed: Dec. 2, 2020

(65) Prior Publication Data

US 2022/0101073 A1 Mar. 31, 2022

(30) Foreign Application Priority Data

Sep. 30, 2020 (IN) .............................. 202041042611

(51) Int. Cl.
*G06V 30/194* (2022.01)
*G06K 9/62* (2022.01)
*G06V 30/19* (2022.01)

(52) U.S. Cl.
CPC ......... *G06V 30/194* (2022.01); *G06K 9/6267* (2013.01); *G06V 30/19173* (2022.01)

(58) Field of Classification Search
CPC ........... G06V 30/194; G06V 30/19173; G06K 9/6267
See application file for complete search history.

(56) References Cited

U.S. PATENT DOCUMENTS

| | | | | |
|---|---|---|---|---|
| 5,444,796 | A * | 8/1995 | Ornstein | G06K 9/6267 382/157 |
| 8,131,655 | B1 * | 3/2012 | Cosoi | G06N 3/0454 706/12 |
| 8,774,498 | B2 | 7/2014 | de Campos et al. | |
| 10,223,635 | B2 | 3/2019 | Annapureddy et al. | |
| 11,170,260 | B2 * | 11/2021 | Xu | G06V 10/56 |
| 11,244,226 | B2 * | 2/2022 | Munkberg | G06N 3/084 |
| 2016/0034788 | A1 | 2/2016 | Lin et al. | |
| 2019/0034557 | A1 * | 1/2019 | Alsallakh | G06K 9/6271 |
| 2020/0311548 | A1 * | 10/2020 | Shrivastava | G06F 17/15 |
| 2021/0233144 | A1 * | 7/2021 | Gaur | G06N 5/04 |
| 2021/0397943 | A1 * | 12/2021 | Ribalta | G06N 3/063 |
| 2022/0019840 | A1 * | 1/2022 | Xie | G06K 9/6201 |

* cited by examiner

*Primary Examiner* — John B Strege
(74) *Attorney, Agent, or Firm* — Finnegan, Henderson, Farabow, Garrett & Dunner, LLP

(57) ABSTRACT

The present disclosure relates to method and system for performing classification of real-time input sample using compressed classification model. Classification system receives classification model configured to classify training input sample. Relevant neurons are identified from neurons of the classification model. Classification error is identified for each class. Reward value is determined for the relevant neurons based on relevance score of each neuron and the classification error. Optimal image is generated for each class based on the reward value of the relevant neurons. The optimal image is provided to the classification model for generating classification error vector for each class. The classification error vector is used for identifying pure neurons from the relevant neurons. A compressed classification model comprising the pure neurons is generated. The generated compressed classification model is used for performing the classification of real-time input sample.

20 Claims, 9 Drawing Sheets

METHOD AND SYSTEM FOR PERFORMING CLASSIFICATION OF REAL-TIME INPUT SAMPLE USING COMPRESSED CLASSIFICATION MODEL

TECHNICAL FIELD

The present disclosure relates to classification of data using neural networks. More particularly, the present disclosure relates to a method and a system for performing classification of real-time input sample using a compressed classification model.

BACKGROUND

Neural networks are computational models, which try to mimic the way human brain develops classification rules. A neural network model identifies hidden patterns and derives correlations in input data to classify the input data to a corresponding associated class. In a training phase, the neural network model learns the input data and fine tunes itself by analyzing new set of data. Generally, an accuracy of the neural network model is dependent on a cost function. The cost function is a function that measures a deviation in a particular solution from the best possible solution. The accuracy of the neural network may be increased by optimizing the cost function. Optimization of the cost functions involves optimizing weights and biases provided to the neural network model.

A conventional system (100) for classification of an input sample (101) using a classification model (102) is shown in FIG. 1. The classification model (102) used for digit classification is provided as an example to illustrate classification using the conventional system (100). The classification model (102) may be configured to classify the input sample (101) into a class from a plurality of classes. The plurality of classes may be class 0 to class 9 for the digit classification. The input sample (101) may be an image sample from a training dataset provided to train the classification model (102). The input sample (101) may be a distorted form of a digit. For example, the input sample (101) is distorted form of digit 6. The input sample (101) may be used for training the classification model (102). Different types of such input sample may be used for training the classification model (102). The classification model (102) may receive the input sample (101) for training. The classification model (102) may comprise plurality of layers comprising an input layer, one or more hidden layers, and an output layer. One hidden layer between an input layer and an output layer is shown as an example, in FIG. 1. Each of the plurality of layers may comprise one or more neurons. Each neuron from the one or more neurons, is a mathematical operation that takes an input, multiplies the input with a weight and passes a sum to other neurons in subsequent layers. Each neuron may be trained using a plurality of feature vectors of the input sample (101). Each neuron in the output layer may correspond to classification of the input sample (101) into one of the plurality of classes of the classification model (102). An output of a neuron corresponds to a value of an activation function. The activation function in a neural network helps normalize the output of the neuron to a range of values, for example, 0 to 1. The output of the neuron with highest value of the activation function may correspond to an output of the classification model (102). In example provided in FIG. 1, the predicted output (103) is class 2. However, an actual desired output is class 6. The difference between the predicted output and the actual desired output is termed as an error. The error is backpropagated to the classification model (102). Backpropagation helps to adjust the weights of the one or more neurons such that the error between the predicted output and the actual desired output is reduced. A gradient descent algorithm may be used for backpropagating the neural network. The classification model (102) may be associated with a weight determination module (104). The weight determination module (104) determines a weight to each neuron corresponding to the error. FIG. 1 represents weights as $w_1$ to $w_n$ for 'n' neurons in a layer. The weight may be represented as $w_0+\Delta w$, where $w_0$ represents initial weight and $\Delta w$ represents a change of weight. The weight of each neuron is multiplied to input of the neuron and a bias value is added. The bias value allows the activation function to shift either left or right to fit data for the classification in a better way. The weights and the bias values are adjusted multiple times during the training phase, until a cost function is optimized. The cost function is a function that measures a deviation in a particular solution from best possible solution. The process of optimizing the cost function involves multiple iterations in variation of the weights and the biases. As shown in FIG. 1, final output (105) may be obtained to be class 6, which is the actual desired output. The actual desired output was obtained after multiple iterations in variation of the weights and the biases.

One way of optimizing the cost function is to identify relevant features for the input data during classification of the data. Traditional techniques for classification of the input data using relevant features comprises usage of one set of features of the input data to fine-tune the classification of other features of the input data. However, in the traditional approach, weight factors of the classification model (102) for classifying the data, are varied. Also, the variation of the weight factors repeatedly, for each training data, leads to inadequate training of the classification model (102). The inadequate training decreases accuracy in the classification. Moreover, the variation of the weights and the biases of the classification model (102) is an iterative process. The iterative process may take longer time and immense effort. The accuracy of classification process is further reduced as a particular value or factor for variation of the weight is undetermined. Hence, there is a need for an improved system for classification of relevant features of the image.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method of performing classification of real-time input sample using a compressed classification model. The method comprises identifying one or more relevant neurons from a plurality of neurons in a classification model configured to classify at least one training input sample to be associated with one of a plurality of classes. Further, the method comprises identifying a classification error, for each class from the plurality of classes. The classification error indicates a deviation of output of the classification model from desired output, for classification of the at least one training input sample. Furthermore, the method comprises determining a reward value for the one or more relevant neurons for each class, based on a relevance score of each neuron and the classification error of corresponding class.

Furthermore, the method comprises generating an optimal image for each class, based on the reward value of the one or more relevant neurons of the corresponding class. Moreover, the method comprises providing the optimal image to the classification model for generating a classification error vector for each class. The classification error vector is used for identifying one or more pure neurons from the one or more relevant neurons. Thereafter, the method comprises generating a compressed classification model, comprising the one or more pure neurons for each class from the plurality of classes, for the classification model. The generated compressed classification model is used for performing the classification of real-time input sample.

In an embodiment, the present disclosure discloses a classification system for performing classification of real-time input sample using a compressed classification model. The classification system comprises at least one processor and a memory. The at least one processor is configured to identify one or more relevant neurons from a plurality of neurons in a classification model. The classification model is configured to classify at least one training input sample to be associated with one of a plurality of classes. Further, the at least one processor is configured to identify a classification error, for each class from the plurality of classes. The classification error indicates a deviation of output of the classification model from desired output, for classification of the at least one training input sample. Furthermore, the at least one processor is are configured to determine a reward value for the one or more relevant neurons for each class, based on a relevance score of each neuron and the classification error of corresponding class. Furthermore, the at least one processor is configured to generate an optimal image for each class, based on the reward value of the one or more relevant neurons of the corresponding class. Moreover, the at least one processor is configured to provide the optimal image to the classification model for generating a classification error vector for each class. The classification error vector is used for identifying one or more pure neurons from the one or more relevant neurons. Thereafter, the at least one processor is configured to generate a compressed classification model, comprising the one or more pure neurons for each class from the plurality of classes, for the classification model. The generated compressed classification model is used for performing the classification of real-time input sample.

In an embodiment, the present disclosure discloses a non-transitory computer readable medium including instructions stored thereon that when processed by at least one processor cause a classification system to perform classification of real-time input sample using a compressed classification model. The at least one processor is configured to identify one or more relevant neurons from a plurality of neurons in a classification model. The classification model is configured to classify at least one training input sample to be associated with one of a plurality of classes. Further, the at least one processor is configured to identify a classification error, for each class from the plurality of classes. The classification error indicates a deviation of output of the classification model from desired output, for classification of the at least one training input sample. Furthermore, the at least one processor is configured to determine a reward value for the one or more relevant neurons for each class, based on a relevance score of each neuron and the classification error of corresponding class. Furthermore, the at least one processor is configured to generate an optimal image for each class, based on the reward value of the one or more relevant neurons of the corresponding class. Moreover, the at least one processor is configured to provide the optimal image to the classification model for generating a classification error vector for each class. The classification error vector is used for identifying one or more pure neurons from the one or more relevant neurons. Thereafter, the at least one processor is configured to generate a compressed classification model, comprising the one or more pure neurons for each class from the plurality of classes, for the classification model. The generated compressed classification model is used for performing the classification of real-time input sample.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
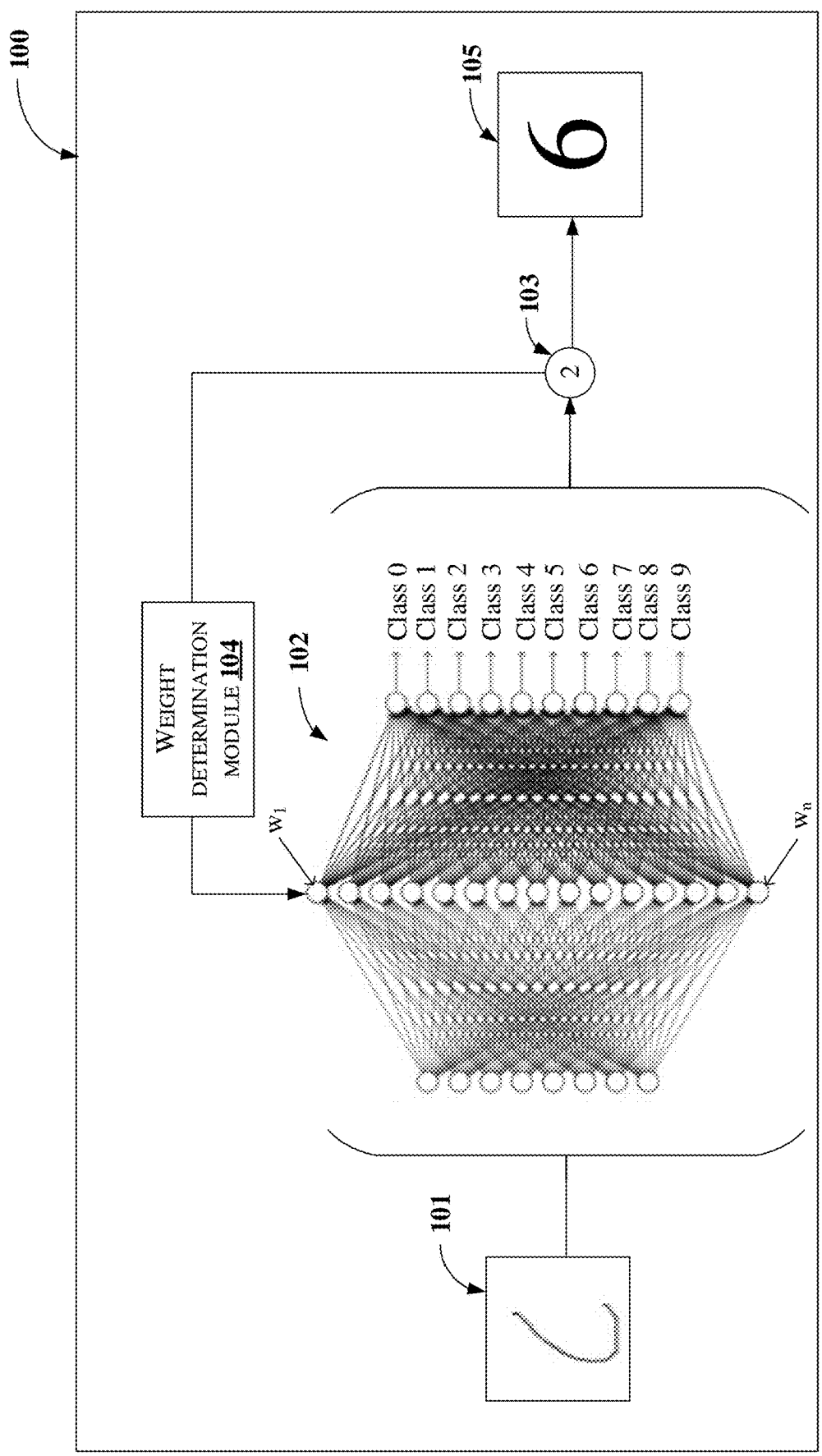
FIG. 1 shows a conventional system for classification of an input sample using a classification model.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and system for performing classification of real-time input sample using compressed classification model. Firstly, a classification model is received. The classification model comprising neurons, is configured to classify a training input sample into a class from various classes. Relevant neurons for classification of training input sample are identified from the neurons of the classification model. Hence, neurons taking part in the classification are identified. Further, a classification error is identified for each class from the classes associated with the classification model. A reward value is determined for the relevant neurons based on a relevance score of each neuron and the classification error. Optimal image is generated for each class based on the reward value of the relevant neurons. Further, the optimal image is provided to the classification model. A classification error vector for each class is generated upon classification of the optimal image by the classification model. Pure neurons are identified from the relevant neurons based on the classification error vector. Hence, neurons taking part in the classification are further identified from the relevant neurons. This helps to eliminate neurons which remain inert during the classification. Thereafter, a compressed classification model comprising the pure neurons is generated. The generated compressed classification model is used for performing the classification of real-time input sample. By the present disclosure, only relevant neurons are considered for performing the classification. Hence, number of neurons used for classification are less compared to conventional systems.

Figure 2A:
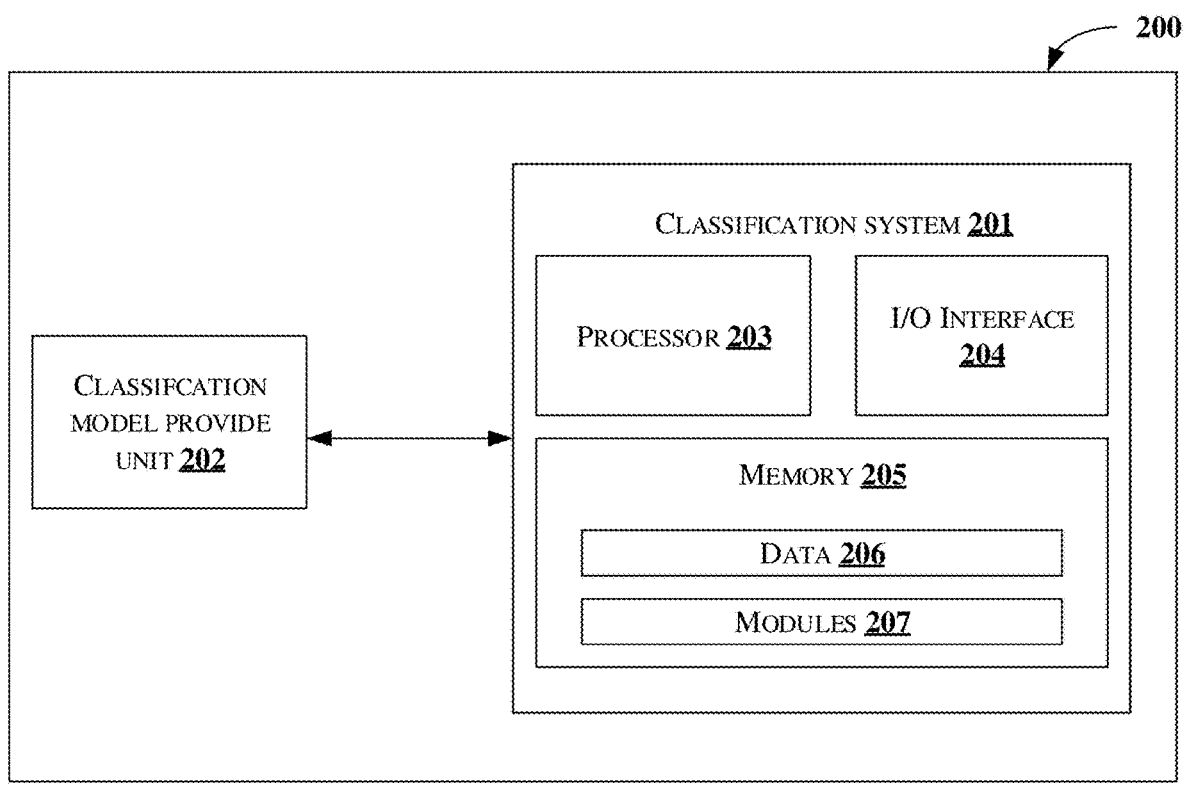
FIG. 2A illustrates a brief internal architecture of a classification system, in accordance with some embodiments of the present disclosure.

FIG. 2A illustrates a brief internal architecture (200) of a classification system (201), in accordance with some embodiments of the present disclosure. The classification system (201) may be used for performing classification of a real-time input sample using a compressed classification model. The classification system (201) may be implemented in a variety of computing systems, such as a laptop, computer, a desktop computer, a Personal Computer (PC), a notebook, a smartphone, a tablet, e-book readers, a server, a network server, a cloud-based server and the like. The classification system (201) may include at least one Central Processing Unit (also referred to as "CPU" or "processor") (203) and a memory (205) storing instructions executable by the at least one processor (203). The at least one processor (203) may comprise at least one data processor for executing program components to execute user requests or system-generated requests. The memory (205) is communicatively coupled to the at least one processor (203). The memory (205) stores instructions, executable by the at least one processor (203), which, on execution, may cause the classification system (201) to perform the classification, as disclosed in the present disclosure. In an embodiment, the memory (205) may include modules (207) and data (206). The modules (207) may be configured to perform the steps of the present disclosure using the data (206), to perform the classification. In an embodiment, each of the modules (207) may be a hardware unit which may be outside the memory (205) and coupled with the classification system (201). As used herein, the term modules (207) refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide described functionality. The modules (207) when configured with the described functionality defined in the present disclosure will result in a novel hardware. The classification system (201) further comprises an Input/Output (I/O) interface (204). The I/O interface (204) is coupled with the at least one processor (203) through which an input signal or/and an output signal is communicated. The input signal and the output signal may represent data received by the classification system (201) and data transmitted by the classification system (201), respectively. In an embodiment of the present disclosure, the classification system (201) may be configured to receive and transmit data via the I/O interface (204). The received data may comprise the classification model, user inputs, and the like. The transmitted data may include compressed classification model, the optimal image, and the like.

In an embodiment, the classification system (201) may communicate with a classification model provide unit (202). In an embodiment, the classification system (201) may be communicatively coupled to the classification model provide unit (202). In another embodiment, the classification model provide unit (202) may be integral part of the classification system (201). The classification system (201) and the classification model provide unit (202) may communicate over a communication network. The communication network may include, without limitation, a direct interconnection, local area network (LAN), wide area network (WAN), wireless network (e.g., using Wireless Application Protocol), the Internet, etc. In an embodiment, the classification model provide unit (202) may be configured to generate a classification model. In another embodiment, the classification model provide unit (202) may be configured to store the classification model provided by a user. The classification model may be, for example, logistic regression, decision tree, random forest, Naive Bayes, and the like The classification system (201) may be configured to receive the classification model from the classification model provide unit (202). The classification system (201) may generate a compressed classification model for the classification model. The generated compressed classification model may be used for performing the classification of the real-time input sample.

Figure 2B:
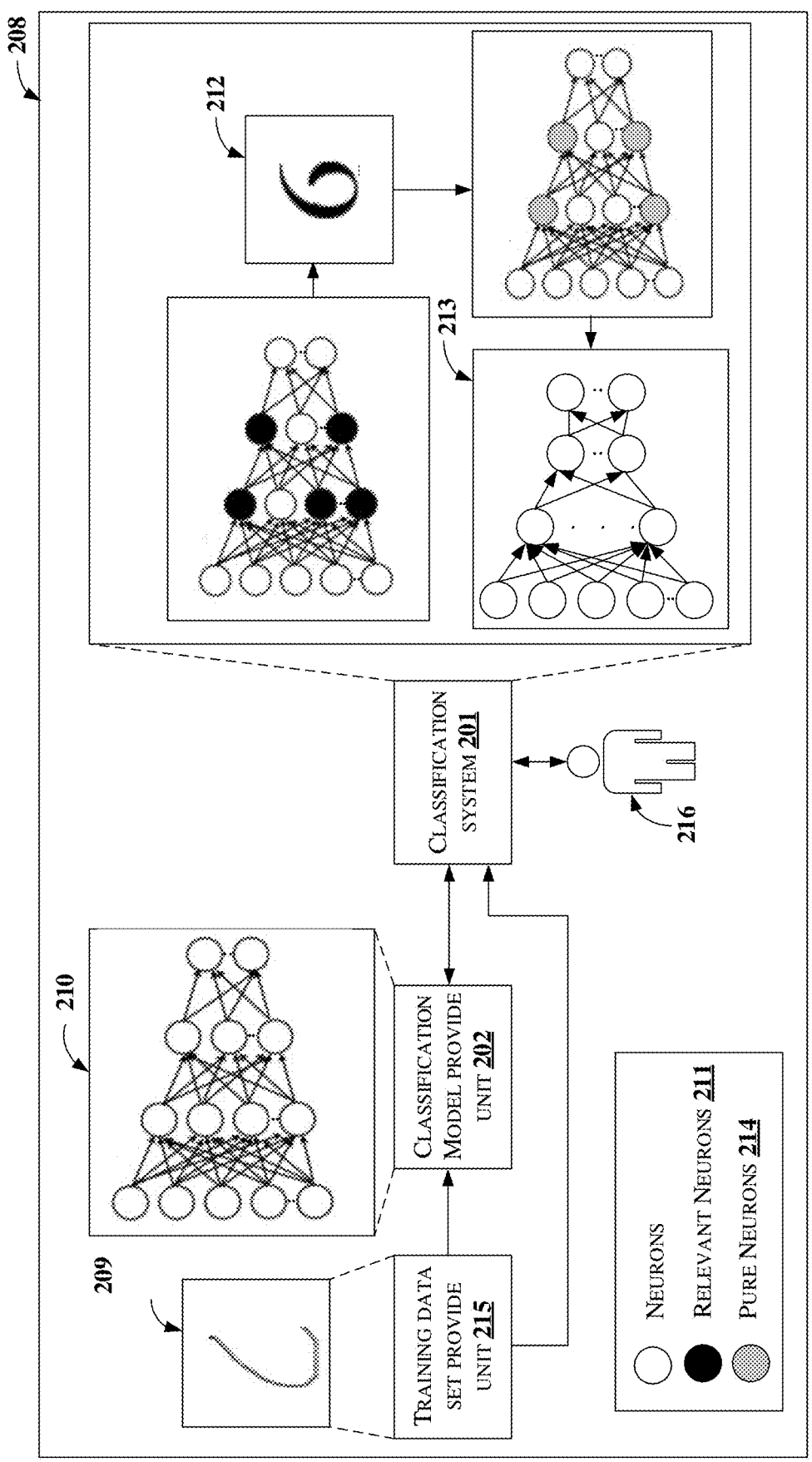
FIG. 2B shows an exemplary environment for performing classification of real-time input sample using a compressed classification model, in accordance with some embodiments of the present disclosure.

FIG. 2B shows an exemplary environment (208) for performing classification of the real-time input sample using the compressed classification model generated by the classification system (201). Digit classification is provided as an example to illustrate performing the classification, as disclosed in the present disclosure. Classes in the digit classification may be class 0 to class 9. The exemplary environment (208) comprises training dataset provide unit (215), the classification model provide unit (202), the classification system (201) and a user (216). The training dataset provide unit (215) may provide at least one training input sample (209) to the classification model provide unit (202). The at least one training input sample (209) may be an image from a training data set provided by the training dataset provide unit (215) to the classification system (201). The training data set is an initial set of data comprising different kinds of inputs and desired outputs to train the classification model (210). The training data set is generated by collecting large set of data and by labelling the data appropriately. The training data set may comprise a plurality of training input samples corresponding to a plurality of classes associated with the classification model (210). For example, training input sample corresponding to class 6 may comprise a blurred image of digit 6. In another example, the training input sample corresponding to the class 6 may be an image of digit 6 with a partial feature of digit 8 to train the classification model (210) to distinguish between class 6 and class 8. The at least one training input sample (209) may correspond to a class from the plurality of classes associated with the classification model (210). For example, the at least one training input sample (209) corresponds to class 6 in FIG. 2B. The classification model (210) may be configured to classify the at least one training input sample (209) to be associated with one of the plurality of classes. The classification model (210) may comprise a plurality of neurons constituting plurality of layers. Each layer from the plurality of layers comprise one or more neurons. The classification model (210) of FIG. 2B is used for digit classification. Other applications of classification model (210) may be face recognition, flower species classification and the like. The classification model (210) may be logistic regression, decision tree, random forest, Naive Bayes, and the like. The classification model provide unit (202) may provide the classification model (210) to the classification system (201). The training dataset provide unit (215) may provide the at least one training input sample (209) to the classification system (201). The classification system (201) may identify one or more relevant neurons (211) from the plurality of neurons in the classification model (210) based on at least one dominant attribute relating to each class and relevance score for each neuron. A reward value may be determined for the one or more relevant neurons (211) based on a classification error of each class and the relevance score. The determined reward value is a measure of neurons taking part in the classification. Further, the optimal image (212) may be generated based on the reward value of the one or more relevant neurons (211). The optimal image (212) may be an image comprising one or more relevant attributes of the corresponding class. The optimal image (212) may be provided to the user (216). The user (216) may provide inputs based on closeness of the optimal image (212) to a desired image corresponding to the class. A classification error vector may be generated upon classification of the optimal image (212). One or more pure neurons (214) may be identified from the one or more relevant neurons (211) based on the classification error vector. The classification error vector may indicate further neurons (referred as one or more pure neurons) taking part in the classification. The optimal image (212) may be updated based on the inputs from the user (216). The one or more pure neurons (214) may be re-identified based on a classification error vector generated upon classification of the updated optimal image. Finally, a compressed classification model (213) comprising the one or more pure neurons (214) may be generated. The generated compressed classification model (213) may be used for performing the classification of real-time input sample.

Figure 3:
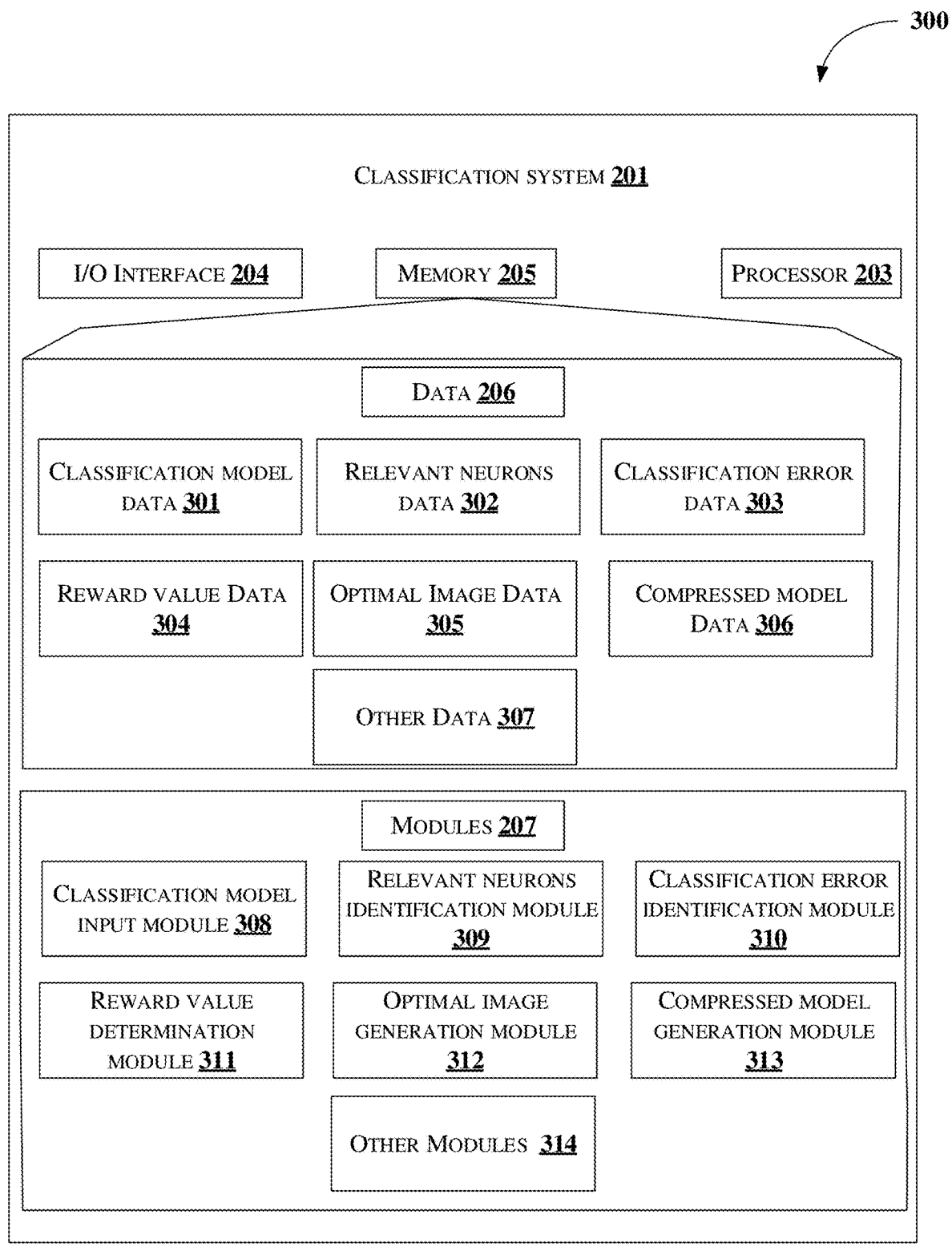
FIG. 3 illustrates a detailed internal architecture of a classification system, in accordance with some embodiments of the present disclosure.

FIG. 3 illustrates a detailed internal architecture (300) of the classification system (201) in accordance with some embodiments of the present disclosure. The classification system (201) may include the at least one processor (203), the memory (205) and the I/O interface (204). The memory (205) may include the modules (207) and the data (206).

In one implementation, the modules (207) may include, for example, a classification model input module (308), a relevant neurons identification module (309), a classification error identification module (310), a reward value determination module (311), an optimal image generation module (312), a compressed model generation module (313), and other modules (314). It will be appreciated that such aforementioned modules (207) may be represented as a single module or a combination of different modules. In one implementation, the data (206) may include, for example, classification model data (301), relevant neurons data (302), classification error data (303), reward value data (304), optimal image data (305), compressed model data (306) and other data (307).

In an embodiment, the classification model input module (308) may be configured to receive the classification model (210) from the classification model provide unit (202). The classification model (210) may be stored as the classification model data (301) in the memory (205). The classification model data (301) may comprise data related to the classification model (210). The training data set provide unit (215) may be in communication with the classification system (201). The training data set provide unit (215) may provide the training dataset to the classification system (201). In an embodiment, the training data set provide unit (215) may be in communication with the classification model provide unit (202) and the training data set provide unit (215) may provide the training data set associated with the classification model (210) to the classification model provide unit (202). In such case, the classification model data (301) may also comprise the training dataset associated with the classification model (210). In an embodiment, data related to classification of training input samples from the training dataset may be stored as the other data (307) in the memory (205). The data related to the classification of the training input samples may comprise data related to neurons of the classification model (210), feature vectors corresponding to the training input samples, weights associated with each neurons, a set of output class labels assigned to the feature vectors and the like. In an embodiment, the set of output class labels may be manually associated with the training input samples during training The set of output class labels may indicate desired output classes when the training input samples are provided as input.

In an embodiment, the relevant neurons identification module (309) may be configured to receive the classification model data (301). The relevant neurons identification module (309) may identify the at least one dominant attribute relating to each class from the plurality of classes associated with the classification model (210). Further, the relevant neurons identification module (309) may determine the relevance score of each neuron from the plurality of neurons in the classification model (210). The relevant neurons identification module (309) may determine the relevance score for each neuron using at least one of an activation function and a Layer-wise Relevance Propagation (LRP) technique. A person skilled in the art will appreciate that any other similar techniques to monitor activation of the plurality of neurons may be used. Data related to the one or more relevant neurons (211) may be stored as the relevant neurons data (302) in the memory (205). The identified at least one dominant attribute relating to each class from the plurality of classes, the relevance score for each neuron from the plurality of neurons, information relating to activation of the plurality of neurons, and the like may be stored as the other data (307) in the memory (205).

In an embodiment, the classification error identification module (310) may identify the classification error for each class from the plurality of classes. The classification error may indicate a deviation of output of the classification model (210) from the desired output, for classification of the at least one training input sample (209). Further, the classification error identification module (310) may be configured to minimize the classification error, when the classification error exceeds the predetermined threshold value. In one embodiment, the classification error identification module (310) may receive the inputs from the user (216) to minimize the classification error. In another embodiment, the classification error identification module (310) may minimize the error by discarding at least one irrelevant training input sample from the training dataset. The classification error computed for each class from the plurality of classes may be stored as the classification error data (303) in the memory (205). Data related to identification of the classification error for each class from the plurality of classes may be stored as the other data (307) in the memory (205). In an embodiment, the data related to identification of the classification error may comprise desired outputs of classification of the at least one training input sample (209), output of the classification model (210), user input data to minimize the classification error and the like.

In an embodiment, the reward value determination module (311) may receive the relevant neurons data (302) and the classification error data (303). The reward value determination module (311) may determine if the classification error is one of, lesser than and greater than the predetermined threshold value. The reward value determination module (311) may determine the reward value for the one or more relevant neurons (211) of each class, when the classification error of the corresponding class is lesser than the predetermined threshold value. The reward value determination module (311) may determine the reward value for the one or more relevant neurons (211) for each class, based on the relevance score of each neuron and the classification error of corresponding class. When the classification value is greater than the predetermined threshold value, the classification error identification module (310) may minimize the error, until the classification error becomes lesser than the predetermined threshold value. A person skilled in the art will appreciate that known techniques may be implemented in the classification system (201) to minimize the error. The reward value determination module (311) may determine the reward value, when the classification error becomes lesser than the predetermined threshold value. Further, the reward value determination module (311) may update the reward value of the one or more relevant neurons (211) for the corresponding class based on the inputs from the user (216) for the optimal image (212). The reward value for the one or more relevant neurons (211) for each class from the plurality of classes may be stored as the reward value data (304) in the memory (205). Predetermined threshold values set for the classification error may be stored as the other data (307) in the memory (205).

In an embodiment, the optimal image generation module (312) may receive the reward value of the one or more relevant neurons (211) for each class. The optimal image generation module (312) may generate the optimal image (212) for each class, based on the reward value of the one or more relevant neurons (211) of the corresponding class. The optimal image (212) for each class, comprises one or more relevant attributes of the corresponding class. The one or more relevant attributes corresponds to a plurality of output images from the one or more relevant neurons (211). The plurality of output images is obtained by classifying the at least one training input sample (209). Further, the optimal image generation module (312) may update the optimal image (212) for the corresponding class based on the updated reward value. The optimal image (212) for each class may be stored as the optimal image data (305) in the memory (205). The plurality of output images from the one or more relevant neurons (211), the updated optimal image, and the updated reward value may be stored as the other data (307) in the memory (205).

In an embodiment, the compressed model generation module (313) provides the optimal image (212) to the classification model (210). The classification error vector is generated for each class upon classification of the optimal image (212). The compressed model generation module (313) monitors a plurality of errors associated with each output line from a plurality of output lines. The plurality of errors are values of the classification error vector. The plurality of output lines is obtained upon classification of the optimal image (212) to be associated with the corresponding class. The plurality of errors is indicative of an activation of a set of neurons from the one or more relevant neurons (211) for at least two classes from the plurality of classes. The compressed model generation module (313) identifies the one or more pure neurons (214) from the one or more relevant neurons (211) by discarding the set of neurons. Further, the compressed model generation module (313) generates the compressed classification model (213) comprising the one or more pure neurons (214) for each class from the plurality of classes. In an embodiment, the compressed model data (306) may comprise classification error vector. The compressed classification model (213) may be stored as the compressed model data (306) in the memory (205). The plurality of errors associated with the plurality of output lines of the classification model (210) and the one or more pure neurons (214) may be stored as the other data (307) in the memory (205).

In an embodiment, the other modules (314) may comprise a user interface. The user (216) may provide inputs relating to the classification error and the optimal image (212) through the user interface. The other data (307) may comprise inputs from the user (216), weights associated with the reward value, and the like.

Figure 4:
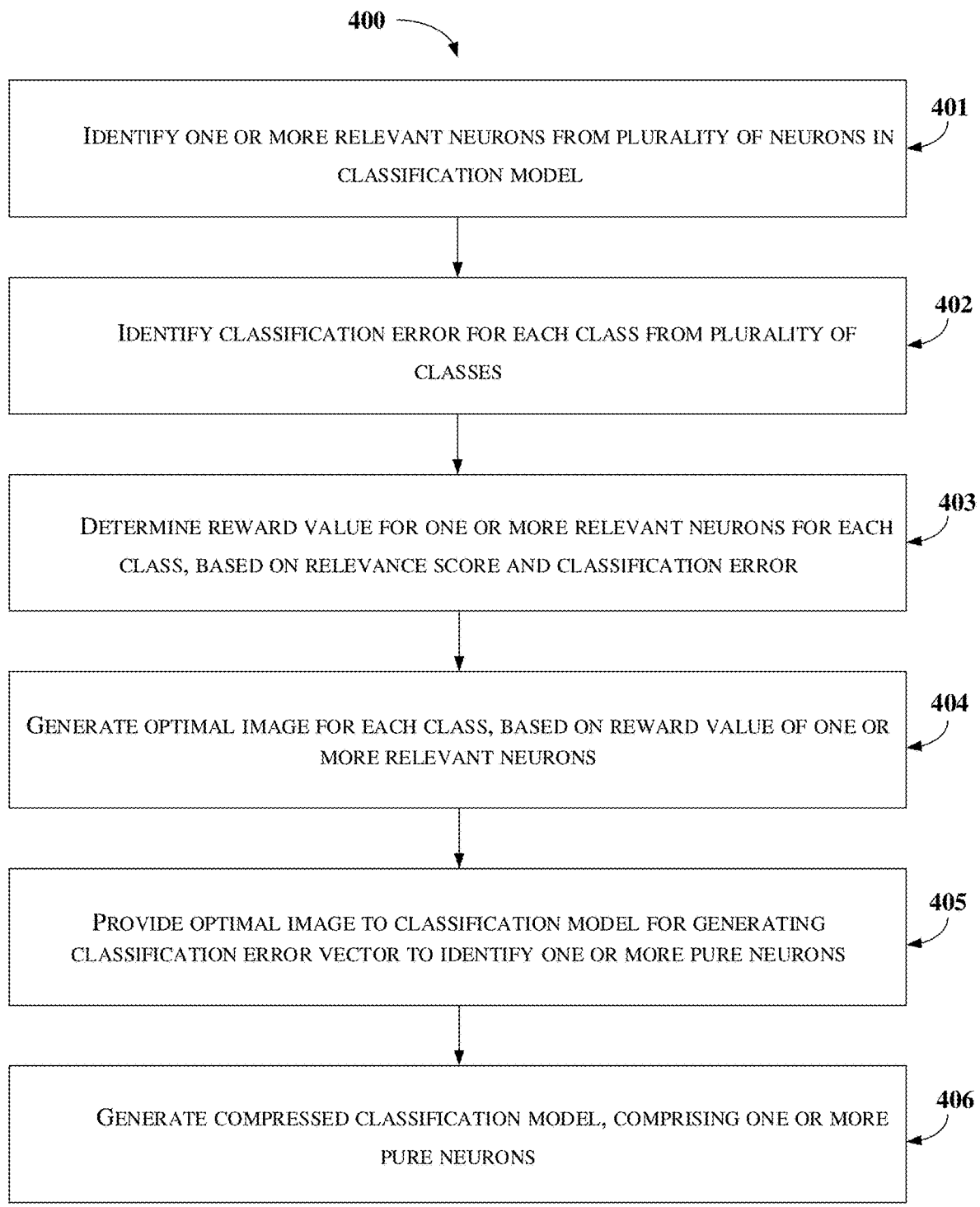
FIG. 4 shows an exemplary flow chart illustrating a method for performing classification of real-time input sample using a compressed classification model, in accordance with some embodiments of the present disclosure.

FIG. 4 shows a flow chart illustrating a method for performing classification of real-time input sample using the compressed classification model (213), in accordance with some embodiments of the present disclosure. As illustrated in FIG. 4, the method (400) may comprise one or more steps. The method (400) may be described in the general context of computer executable instructions. Generally, computer executable instructions can include routines, programs, objects, components, data structures, procedures, modules, and functions, which perform particular functions or implement particular abstract data types.

The order in which the method (400) is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Figure 5:
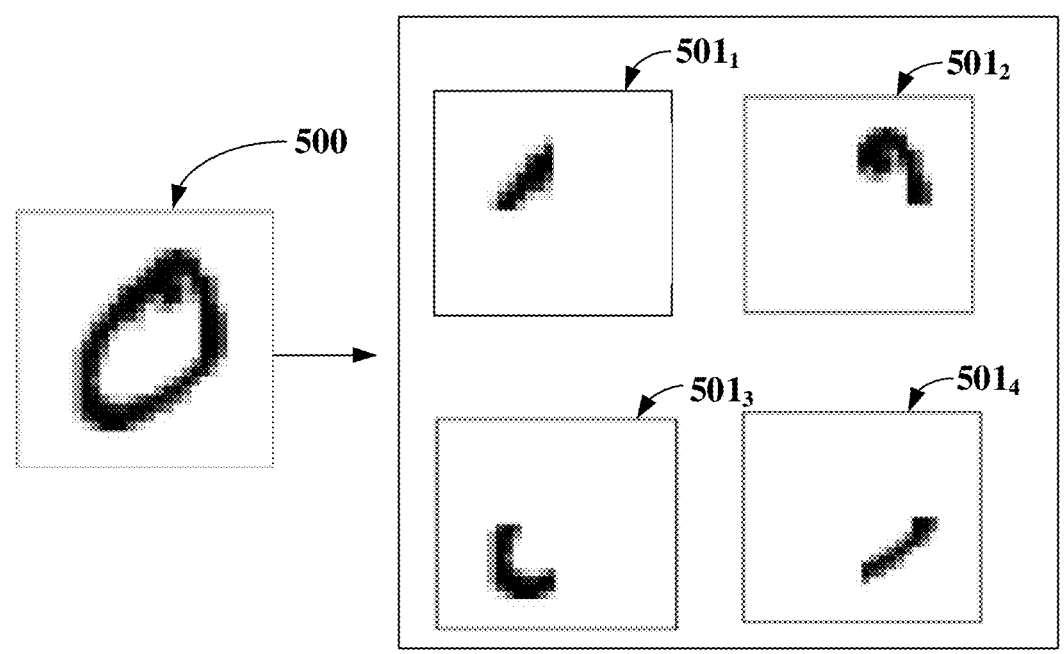
FIG. 5 shows exemplary representation of attributes of a class from a plurality of classes of a classification model, in accordance with embodiments of the present disclosure.

At step (401), identifying, by the classification system (201), the one or more relevant neurons (211) from the plurality of neurons in the classification model (210) is performed. The classification system (201) may receive the classification model (210). The classification model (210) is configured to classify the at least one training input sample (209) to be associated with one of the plurality of classes. For example, the classification model (210) may be used for digit classification. Referring to FIG. 5, the classification model (210) may be configured to classify a training input sample (500) to be associated with one of the classes 0-9. The classification system (201) may be configured to identify the one or more relevant neurons (211) from the plurality of neurons in the classification model (210). The classification system (201) may identify the one or more relevant neurons (211) for each class from the plurality of classes, based on the at least one dominant attribute relating to each class from the plurality of classes and the relevance score for each neuron from the plurality of neurons. The at least one dominant attribute comprises at least one of, a color, a texture, a shape, brightness, and an orientation corresponding to the plurality of training input samples. The identification of the at least one dominant attribute may comprise monitoring activation of a set of neurons from the plurality of neurons, for each class, during classification of the plurality of training input samples. Further, the identification of the at least one dominant attribute may comprise identifying attributes relating to the set of neurons, for each class, to be the at least one dominant attribute for the corresponding class. For example, 4 training input samples corresponding to digit '0' may be provided to the classification model (210). Neuron 1 and neuron 3 in a first hidden layer, and neuron 2 and neuron 4 in a second hidden layer may be activated for all the 4 training input samples. An attribute ($501_1$) of the digit '0' relating to the neuron 1 of the first hidden layer may be identified as a dominant attribute. In a similar way, other dominant attributes ($501_2$, $501_3$, and $501_4$) of digit '0' are identified. In a second example, neuron 1, neuron 3, neuron 4 in a first hidden layer, and neuron 1 and neuron 3 in a second hidden layer may be activated for all the 10 training input samples corresponding to digit '6'. The dominant attribute corresponding to the digit '6' may be two curves where a smaller curve meets the bigger opposite curve at a point. An attribute (not shown in Figures) of the digit '6' relating to the neuron 3 of the first hidden layer may be identified as a dominant attribute. In a third example, the dominant attribute corresponding to digit '5' may be a straight line at the top of the image and a curve at the bottom of the image. The classification system (201) may determine the relevance score for each neuron using at least one of an activation function and a Layer-wise Relevance Propagation (LRP) technique. The activation function may comprise a rectifier, an absolute value function, a hyperbolic tangent function, a sigmoid function, and the like. The LRP technique and the activation function are known in the art, and hence are not explained in detail in the present disclosure. The relevance score may be a value between 0 to 1.

Referring to the second example, the neuron 3 of the first hidden layer may be activated for 70 of 100 training input samples. Hence, the relevance score of the neuron 3 of the first hidden layer may be 0.7. The relevance score of neuron 2 in the first hidden layer may be 0.1. The classification system (201) may identify the one or more relevant neurons (211) based on the at least one dominant attribute and the relevance score. In the second example, the neuron 3 in the first hidden layer is identified as a relevant neuron for class '6', since the neuron 3 corresponds to the dominant attribute of the class '6' and the relevance score of the neuron is 0.7. In an embodiment, the threshold value of the relevance score to identify the one or more relevant neurons (211) may be 0.5. Hence, neurons corresponding to a relevance score greater than 0.5 (i.e., activated for more than 50% of the training input samples) may be considered as the one or more relevant neurons (211). Neuron 1, and neuron 4 in the first hidden layer, and neuron 1 and neuron 3 in the second hidden layer may be identified as the other relevant neurons in the second example.

Figure 6:
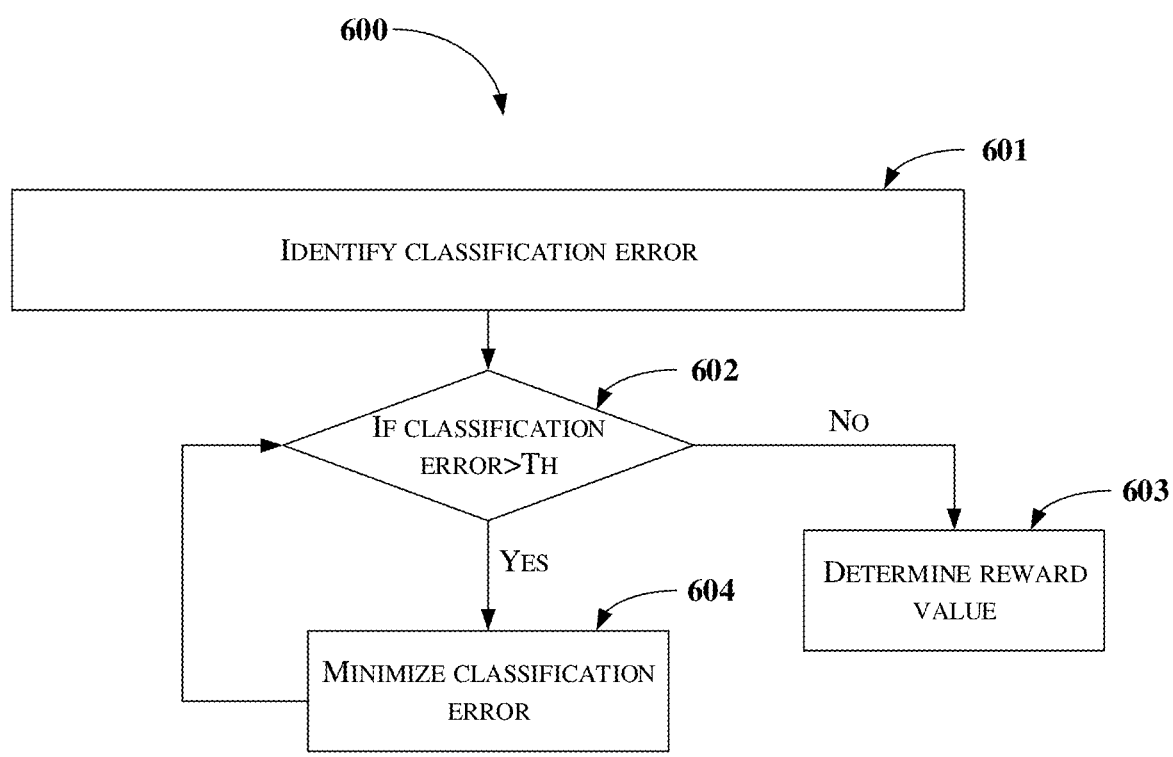
FIG. 6 shows an exemplary flow chart illustrating a method for identifying a classification error, in accordance with some embodiments of the present disclosure.

Referring back to FIG. 3, at step (402), identifying, by the classification system (201), the classification error for each class from the plurality of classes is performed. FIG. 6 shows an exemplary flowchart (600) illustrating steps for identification of the classification error. At step (601), the classification system (201) may identify the classification error for each class from the plurality of classes. The classification error may be obtained upon classification of the at least one training input sample (209) to be associated with a class from the plurality of classes. The classification error may indicate a deviation of output of the classification model (210) from desired output. For example, in classification of digit '6' the output of the classification model (210) may be 0.8. The output 0.8 may refer to probability that the at least one training sample to be associated with the class '6'. Hence, the classification error is identified as 0.2 for one training input sample. An average of all classification errors is considered for all the training input samples corresponding to class '6'. The averaged classification error may be 0.3. At step (602), the classification system (201) may determine the classification error, for each class, to be one of lesser than and greater than a predetermined threshold value. In an embodiment, the predetermined threshold value may be provided by the user (216). The predetermined threshold value is represented as 'Th' in the FIG. 6. At step (603), the reward value is determined for the one or more relevant neurons (211) of each class, when the classification error of the corresponding class is lesser than the predetermined threshold value. At step (604), the classification error is minimized to be lesser than the predetermined threshold value for determining the reward value, when the classification error is greater than the predetermined threshold value. In one embodiment, the classification system (201) may receive the inputs from the user (216) to minimize the classification error. In another embodiment, the classification system (201) may minimize the error by discarding at least one irrelevant training input sample from the training dataset. For example, a training input sample is a highly blurred image. The training input sample may be discarded. The steps (602) and (604) are repeated until the classification error is lesser than the predetermined threshold value.

At step (403), determining, by the classification system (201), the reward value for the one or more relevant neurons (211) for each class, based on the relevance score and the classification error is performed. The classification system (201) may determine the reward value for the one or more relevant neurons (211) for each class, based on the relevance score of each neuron and the classification error of corresponding class.

The reward value is generated based on equation (1) given as below:

$$\text{Reward value of a neuron} = -A*\text{classification error}*\text{relevance score} \quad (1)$$

where, A represents a weight associated with the reward value.

Referring to the second example, the reward value may be 0.5*0.3*0.7=0.105. The initial weight 'A' is considered as 0.5. The negative sign in the equation corresponds to sign of the classification error. The reward value of each neuron is increased by minimizing the classification error of the corresponding class and an increase in the relevance score of the neuron. The classification system (201) may use reinforcement learning for determining the reward value. The reward value is determined for the one or more relevant neurons (211) of each class from the plurality of classes. In the second example, the reward value is determined for the one or more relevant neurons (211) of class '6' i.e., the reward value is determined for neuron 1, neuron 3 and neuron 4 in the first hidden layer, and neuron 1 and neuron 3 in the second hidden layer. Similarly, the reward value is determined for the one or more relevant neurons (211) corresponding to classes other than class '6'.

At step (404), generating, by the classification system (201), the optimal image (212) for each class, based on the reward value of the one or more relevant neurons (211) is performed. The classification system (201) generates the optimal image (212) for each class, based on the reward value of the one or more relevant neurons (211) of the corresponding class. The classification model (210) classifies the at least one training input sample (209) of each class. A plurality of output images is obtained from the one or more relevant neurons (211) of the corresponding class, upon classification of the at least one training input sample (209). The plurality of output images corresponds to one or more relevant attributes of the corresponding class. The optimal image (212) for each class, is generated based on the one or more relevant attributes of the corresponding class. The optimal image (212) generated for each class comprises most of attributes of the corresponding class. For example, referring to FIGS. 5, ($501_1$, $501_2$, $501_3$, and $501_4$) correspond to relevant attributes of class '0', which may be output images from the one or more relevant neurons (211) of the class '0'. The optimal image (212) generated can be correlated with the at least one training input sample (209), which helps in reduction of the training input samples in the training dataset. The classification system (201) may use a Generative Adversarial Network (GAN) to generate the optimal image (212). A person skilled in the art may appreciate that any other methods similar to GAN may be used to generate the optimal image. Referring to the second example, an optimal image for class '6' has most of the features seen in a typical '6'. Further, the user (216) may provide an input for the optimal image (212). The input from the user (216) may also referred as user input in the present disclosure. The user input may correspond the closeness of the optimal image (212) to actual image of the class ('6' in this case). For example, the user input may be 90%, i.e., the generated optimal image (212) is 90% similar to the actual digit 6. The reward value is updated based on the user input for the optimal image (212).

The updated reward value is generated based on equation (2) given as below:

$$\text{Updated reward value of a neuron} = -A*\text{classification error}*\text{relevance score} + B*(1-\text{user input}) \quad (2)$$

where, B refers to weight associated with the user input. When the user input provided to the optimal image (212) is more, the closeness of the optimal image (212) to the actual class is more. Hence, the change to the weight may be less. The updated reward value of the neuron may be 0.105+0.5* (1−0.9)=0.155. The weight is updated with value of Δw=0.155. Referring to the equation (2), when the classification error is 0 and the user input is 100%, there is no requirement to update the weight.

Figure 7:
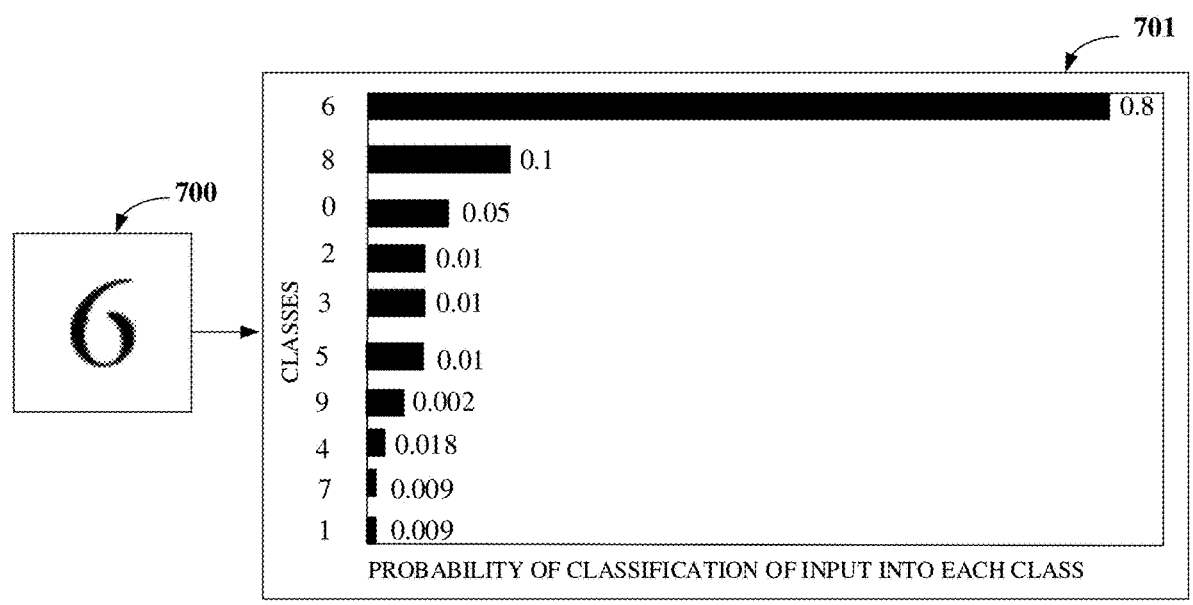
FIG. 7 shows an exemplary output of a classification model, in accordance with some embodiments of the present disclosure.

At step (405), providing, by the classification system (201), the optimal image (212) to the classification model (210) for generating a classification error vector to identify one or more pure neurons (214) from the one or more relevant neurons (211) is performed. The optimal image (212) for each class may be provided to the classification model (210). The classification model (210) may generate an output, upon classification of the at least one training input sample (209) of the corresponding class. The classification error vector may be generated from the output of the classification model (210). Referring to FIG. 7, a training input sample (700) corresponding to class '6' is provided to the classification model (210). The output is represented as (701). The classification error vector comprising a plurality of errors associated with each output line from a plurality of output lines of the output (701) is generated. Each error in the classification error vector is computed as a difference between desired value and the obtained value. Referring to FIG. 7, for the classification of digit '6', the probability that the digit is '6' is 0.8. Hence, the error of the first output line is 0.2. In a similar way, other errors corresponding to the output lines are calculated. The classification vector is generated as {0.2, −0.1, −0.05, −0.01, −0.01, −0.01, −0.002, −0.018, −0.009, −0.009}. Further, the one or more pure neurons (214) are identified from the one or more relevant neurons (211). The plurality of errors associated with each output line from the plurality of output lines are monitored. The plurality of errors is indicative of an activation of a set of neurons from the one or more relevant neurons (211) for at least two classes from the plurality of classes. The one or more pure neurons (214) are identified by discarding the set of neurons. Referring to the second example, the neuron 3 of the first hidden layer may contribute to classification of classes '6' and '8'. Hence, the neuron 3 of the first hidden later may be discarded. The neuron 1 and neuron 4 in the first hidden layer, and neuron 1 and neuron 3 in the second hidden layer may be identified as the one or more pure neurons (214).

At step (406), generating, by the classification system (201), a compressed classification model (213), comprising the one or more pure neurons (214) is performed. The classification system (201) may generate the compressed classification model (213) comprising the one or more pure neurons (214) identified in the previous step. Hence, the classification model (210) is compressed to form the compressed classification model (213). The compressed classification model (213) may comprise only the neurons taking part in classification for a particular class. The neurons that are inert during the classification and corresponds to more than one class may be eliminated. Referring to the second example, the compressed classification model (213) may comprise neuron 1 and neuron 4 in the first hidden layer, and neuron 1 and neuron 3 in the second hidden layer. Only few neurons are considered for explanation in the present disclosure. However, a classification model may comprise a large number of neurons. The compressed classification model (213) is used for performing classification of real-time input sample.

Computer System

Figure 8:
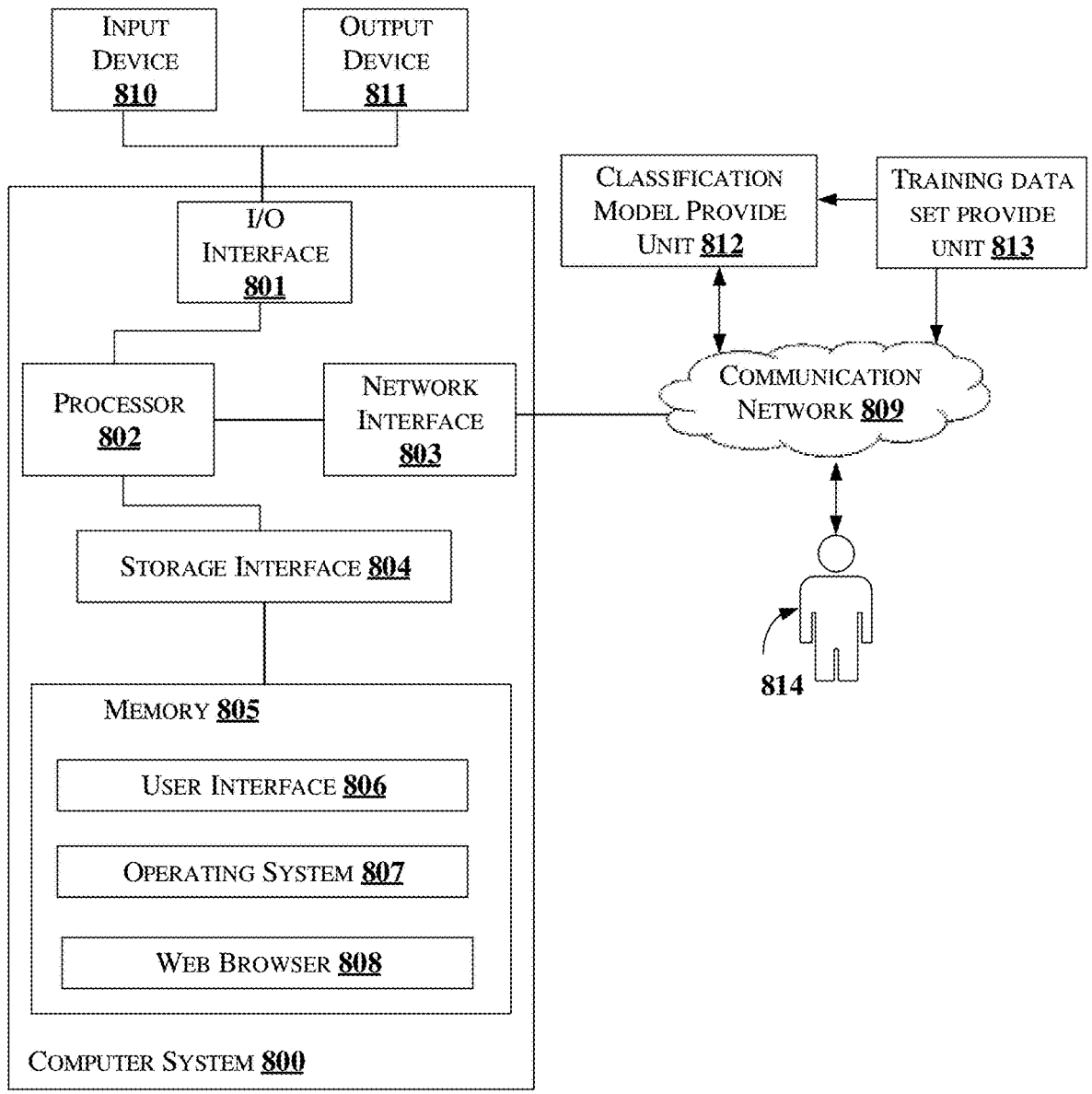
FIG. 8 shows a general computer system for performing classification of real-time input sample using a compressed classification model, in accordance with some embodiments of the present disclosure.

FIG. 8 illustrates a block diagram of an exemplary computer system (800) for implementing embodiments consistent with the present disclosure. In an embodiment, the computer system (800) may be used to implement the classification system (201) of the present disclosure. In an embodiment, the computer system (800) is used for performing classification of real-time input sample using a compressed classification model. The computer system (800) may comprise a central processing unit ("CPU" or "processor") (802). The processor (802) may comprise at least one data processor. The processor (802) may include specialized processing units such as integrated system (bus) controllers, memory management control units, floating point units, graphics processing units, digital signal processing units, etc.

The processor (802) may be disposed in communication with one or more input/output (I/O) devices (not shown) via I/O interface (801). The I/O interface (801) may employ communication protocols/methods such as, without limitation, audio, analog, digital, monoaural, RCA, stereo, IEEE (Institute of Electrical and Electronics Engineers)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (801), the computer system (800) may communicate with one or more I/O devices. For example, the input device (810) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (811) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor (802) may be disposed in communication with the communication network (809) via a network interface (803). The network interface (803) may communicate with the communication network (809). The network interface (803) may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network (809) may include, without limitation, a direct interconnection, local area network (LAN), wide area network (WAN), wireless network (e.g., using Wireless Application Protocol), the Internet, etc. The network interface (803) may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc. The computer system (800) may communicate with the classification model provide unit (812), the training data set provide unit (813) and the user (814) over the communication network (809).

The communication network (809) includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor (802) may be disposed in communication with a memory (805) (e.g., RAM, ROM, etc. not shown in FIG. 8) via a storage interface (804). The storage interface (804) may connect to memory (805) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (805) may store a collection of program or database components, including, without limitation, user interface (806), an operating system (807), web browser (808) etc. In some embodiments, computer system (800) may store user/application data, such as, the data, variables, records, etc., as described in this disclosure. Such databases may be implemented as fault-tolerant, relational, scalable, secure databases such as Oracle® or Sybase®.

The operating system (807) may facilitate resource management and operation of the computer system (800). Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system (800) may implement a web browser (808) stored program component. The web browser (808) may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers (808) may utilize facilities such as AJAX™, DHTML™, ADOBE® FLASH™, JAVASCRIPT™, JAVA™, Application Programming Interfaces (APIs), etc. In some embodiments, the computer system (800) may implement a mail server (not shown in Figure) stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system (800) may implement a mail client stored program component. The mail client (not shown in Figure) may be a mail viewing application, such as APPLE® MAIL™, MICROSOFT® ENTOURAGE™, MICROSOFT® OUTLOOK™, MOZILLA® THUNDER-BIRD™, etc.

Embodiments of the present disclosure propose an efficient training of classification model by considering reward and image component of the neurons in the classification model. Thus, by proposed method of training, neurons taking part in classification are considered and the neurons which are inert during classification are eliminated. By which iterative process of adjustment of weights of the classification model is eliminated.

Embodiments of the present disclosure proposes to select the weights during the training based on activation and relevance score of neurons. Hence, any deviations observed during monitoring the activation of the neurons helps to identify and create a new class for the training input sample.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc Read-Only Memory (CD ROMs), Digital Versatile Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 4 and 6 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method for performing classification of real-time input sample using a compressed classification model, the method comprising:
   identifying, by a classification system, one or more relevant neurons from a plurality of neurons in a classification model configured to classify at least one training input sample to be associated with one of a plurality of classes;
   identifying, by the classification system, a classification error, for each class from the plurality of classes, indicating a deviation of output of the classification model from desired output, for classification of the at least one training input sample;
   determining, by the classification system, a reward value for the one or more relevant neurons for each class, based on a relevance score of each neuron and the classification error of corresponding class;
   generating, by the classification system, an optimal image for each class, based on the reward value of the one or more relevant neurons of the corresponding class;
   providing, by the classification system, the optimal image to the classification model for generating a classification error vector for each class, wherein the classification error vector is used for identifying one or more pure neurons from the one or more relevant neurons; and generating, by the classification system, a compressed classification model, comprising the one or more pure neurons for each class from the plurality of classes, for the classification model, wherein the generated compressed classification model is used for performing the classification of real-time input sample.

2. The method of claim 1, wherein the one or more relevant neurons are identified for each class from the plurality of classes, based on at least one dominant attribute relating to each class from the plurality of classes and the relevance score for each neuron from the plurality of neurons.

3. The method of claim 2, wherein the at least one dominant attribute is identified by:
monitoring activation of set of neurons from the plurality of neurons, for each class, during classification of a plurality of training input samples; and
identifying attributes relating to the set of neurons, for each class, to be the at least one dominant attribute for the corresponding class.

4. The method of claim 3, wherein the at least one dominant attribute comprises at least one of, a color, a texture, a shape, brightness, and an orientation corresponding to the plurality of training input samples.

5. The method of claim 1, wherein the relevance score is determined for each neuron using at least one of an activation function and a Layer-wise Relevance Propagation (LRP) technique.

6. The method of claim 1, wherein the identification of the classification error comprises:
classifying the at least one training input sample to be associated with a class from the plurality of classes; and
determining the classification error, for each class, to be one of lesser than and greater than a predetermined threshold value, wherein the reward value is determined for the one or more relevant neurons of each class, when the classification error of the corresponding class is lesser than the predetermined threshold value, wherein when the classification error is greater than the predetermined threshold value, the classification error is minimized to be lesser than the predetermined threshold value for determining the reward value.

7. The method of claim 1, wherein the classification error vector for each class represents a plurality of errors associated with a plurality of output lines of the classification model, wherein the plurality of output lines are obtained by classifying the optimal image of the corresponding class.

8. The method of claim 1, wherein identifying the one or more pure neurons using the classification error vector comprises:
monitoring a plurality of errors associated with each output line from a plurality of output lines, wherein the plurality of errors are indicative of an activation of a set of neurons from the one or more relevant neurons for at least two classes from the plurality of classes; and
identifying the one or more pure neurons, by discarding the set of neurons from the one or more relevant neurons.

9. The method of claim 1, wherein the optimal image for each class, comprises one or more relevant attributes of the corresponding class, wherein the one or more relevant attributes corresponds to a plurality of output images from the one or more relevant neurons, wherein the plurality of output images are obtained by classifying the at least one training input sample.

10. The method of claim 1, further comprises updating the optimal image for each class, wherein the updating comprises:
receiving inputs from a user for the optimal image of each class;
updating the reward value of the one or more relevant neurons for the corresponding class based on the inputs;
updating the optimal image for the corresponding class based on the updated reward value.

11. A classification system for performing classification of real-time input sample using a compressed classification model, the classification system comprising:
at least one processor; and
a memory, wherein the memory stores processor-executable instructions, which, on execution, cause the at least one processor to:
identify one or more relevant neurons from a plurality of neurons in a classification model configured to classify at least one training input sample to be associated with one of a plurality of classes;
identify a classification error, for each class from the plurality of classes, indicating a deviation of output of the classification model from desired output, for classification of the at least one training input sample;
determine a reward value for the one or more relevant neurons for each class, based on a relevance score of each neuron and the classification error of corresponding class;
generate an optimal image for each class, based on the reward value of the one or more relevant neurons of the corresponding class;
provide the optimal image to the classification model for generating a classification error vector for each class, wherein the classification error vector is used for identifying one or more pure neurons from the one or more relevant neurons; and
generate a compressed classification model, comprising the one or more pure neurons for each class from the plurality of classes, for the classification model, wherein the generated compressed classification model is used for performing the classification of real-time input sample.

12. The classification system of claim 11, wherein the at least one processor identifies the one or more relevant neurons for each class from the plurality of classes, based on at least one dominant attribute relating to each class from the plurality of classes and the relevance score for each neuron from the plurality of neurons.

13. The classification system of claim 12, wherein the at least one processor identifies the at least one dominant attribute by:
monitoring activation of set of neurons from the plurality of neurons, for each class, during classification of a plurality of training input samples; and
identifying attributes relating to the set of neurons, for each class, to be the at least one dominant attribute for the corresponding class.

14. The classification system of claim 11, wherein the at least one processor determines the relevance score for each neuron using at least one of an activation function and a Layer-wise Relevance Propagation (LRP) technique.

15. The classification system of claim 11, wherein the at least one processor identifies the classification error by:
classifying the at least one training input sample to be associated with a class from the plurality of classes; and determining the classification error, for each class, to be one of lesser than and greater than a predetermined threshold value, wherein the reward value is determined for the one or more relevant neurons of each class, when the classification error of the corresponding class is lesser than the predetermined threshold value, wherein when the classification error is greater than the predetermined threshold value, the classification error is minimized to be lesser than the predetermined threshold value for determining the reward value.

16. The classification system of claim 11, wherein the classification error vector for each class represents a plurality of errors associated with a plurality of output lines of the classification model, wherein the plurality of output lines are obtained by classifying the optimal image of corresponding class.

17. The classification system of claim 11, wherein the at least one processor identifies the one or more pure neurons using the classification error vector by:
monitoring a plurality of errors associated with each output line from a plurality of output lines, wherein the plurality of errors are indicative of an activation of a set of neurons from the one or more relevant neurons for at least two classes from the plurality of classes; and
identifying the one or more pure neurons, by discarding the set of neurons from the one or more relevant neurons.

18. The classification system of claim 11, wherein the optimal image for each class, comprises one or more relevant attributes of the corresponding class, wherein the one or more relevant attributes corresponds to a plurality of output images from the one or more relevant neurons, wherein the plurality of output images are obtained by classifying the at least one training input sample.

19. The classification system of claim 11, wherein the at least one processor is further configured to update the optimal image for each class, wherein the updating comprises:

receiving inputs from a user for the optimal image of each class;
updating the reward value of the one or more relevant neurons for the corresponding class based on the inputs;
updating the optimal image for the corresponding class based on the updated reward value.

20. A non-transitory computer readable medium including instructions stored thereon that when processed by at least one processor cause a classification system to,
identify one or more relevant neurons from a plurality of neurons in a classification model configured to classify at least one training input sample to be associated with one of a plurality of classes;
identify a classification error, for each class from the plurality of classes, indicating a deviation of output of the classification model from desired output, for classification of the at least one training input sample;
determine a reward value for the one or more relevant neurons for each class, based on a relevance score of each neuron and the classification error of corresponding class;
generate an optimal image for each class, based on the reward value of the one or more relevant neurons of the corresponding class;
provide the optimal image to the classification model for generating a classification error vector for each class, wherein the classification error vector is used for identifying one or more pure neurons from the one or more relevant neurons; and
generate a compressed classification model, comprising the one or more pure neurons for each class from the plurality of classes, for the classification model, wherein the generated compressed classification model is used for performing the classification of real-time input sample.

\* \* \* \* \*